United States Patent [19]

Blandin et al.

[11] Patent Number: 5,960,955
[45] Date of Patent: Oct. 5, 1999

[54] SAFETY SYSTEM

[75] Inventors: Christophe L. M. Blandin, avenue de Paris; Georges L. Bigot, rue Geley, both of France

[73] Assignee: Eastman Kodak Company, Rochester, N.Y.

[21] Appl. No.: 08/920,546

[22] Filed: Aug. 27, 1997

[30] Foreign Application Priority Data

Nov. 15, 1996 [FR] France ................................ 96 14179

[51] Int. Cl.⁶ .......................... B65D 85/66; B65D 18/28
[52] U.S. Cl. ........................ 206/397; 206/398; 206/408; 242/106.4; 242/615; 355/72
[58] Field of Search .................................. 206/386, 391, 206/394, 397, 408, 398; 242/614, 615, 608, 608.1, 160.1, 160.2, 160.3, 160.4; 355/72

[56] References Cited

U.S. PATENT DOCUMENTS

| | | | |
|---|---|---|---|
| 1,288,401 | 12/1918 | Flanigan | 206/408 |
| 4,903,833 | 2/1990 | Beery | 206/407 |
| 5,287,964 | 2/1994 | Jacquand et al. | 206/391 |
| 5,542,534 | 8/1996 | Dinter et al. | 206/407 |
| 5,680,202 | 10/1997 | Blandin et al. | 355/72 |

FOREIGN PATENT DOCUMENTS

| | | | |
|---|---|---|---|
| 0 532 590 B1 | of 0000 | European Pat. Off. | |
| 4214931 | 11/1992 | Germany | 206/397 |

Primary Examiner—Paul T. Sewell
Assistant Examiner—J. Mohandesi
Attorney, Agent, or Firm—Mark G. Bocchetti

[57] ABSTRACT

The safety system is usable for a container for photographic products in strip form wound on cores which container comprises a substantially horizontal cantilevered spindle having a free end and designed to support the cores and a door which can be located on the spindle by a locating device. The safety system comprises, at the free end of the cantilevered spindle, an element able to move between a first position of rest in which the element does not project beyond the volume delimited by the cylinder of revolution generated by the internal diameter of the cores and prevents the closure of the door, and a second position of rest in which the element projects beyond the volume delimited by the cylinder generated by the internal diameter of the cores in order to prevent the cores from leaving the spindle and releases the locating device so as to allow the closure of the door.

13 Claims, 6 Drawing Sheets

SAFETY SYSTEM

FIELD OF THE INVENTION

The present invention relates to the packaging of photographic products and more particularly to the packaging of products in strip form wound on cores; these strips being very long. The invention is therefore particularly useful for packages in the form of containers comprising essentially a base adapted to handling by a fork lift, a light-tight enclosure provided with a door and a cantilever spindle situated inside the enclosure and designed to receive the rolls. The invention aims to develop a safety system in which the container can be closed only when the rolls can no longer come into abutment against the door.

BACKGROUND OF THE INVENTION

When it is desired to supply, to processing laboratories, products in strip form, such as photographic paper, it is preferable to use strips of very great length, for example approximately 2000 m, in order to allow effective use of the photographic printers. Various solutions have been proposed for supplying such rolls. The patent FR-A-2 658 156 describes a package comprising a light-tight enclosure supported by a base of the pallet type in order to be able to be moved by a fork lift. This package comprises at least one cantilever spindle onto which the rolls to be supplied are introduced. A locking device immobilises the strips during their transportation. In the embodiment depicted this locking is obtained by expansion of the diameter of the spindle. No system is provided to prevent the closure of the doors as long as the rollers are not immobilised on the spindle.

The patent FR-A-2 663 007 describes a package comprising essentially a base adapted to handling by a fork lift, a light-tight enclosure and a cantilever spindle designed to receive rolls of products in strip form. In this document, the package is closed by an end cover which can be fixed to the spindle. The spindle is provided with immobilisation devices associated with each of the rolls by increasing the diameter of the spindle, these devices being controlled from outside. Such a device enables the door to be reclosed without there being any need to lock the rolls since this operation can be performed once the container is closed. However, this arrangement may prove defective since the door can be closed without the operation of locking the rolls having been performed and the operator may forget to perform this operation. In addition, since this locking operation is controlled from outside, it may happen that locking has indeed been effected but that subsequently an unlocking operation has taken place.

The patent FR-A-2 731 527 describes a package of the same type as those described previously, having means internal to the container for driving the rolls towards the outside of the container. Nothing is mentioned with regard to the locking of the rolls.

SUMMARY OF THE INVENTION

The packages described above therefore have no reliable device aimed at preventing their movement as long as the rolls disposed on the spindle are not held on this spindle.

The object of the invention is therefore to provide a package which does not have the above-mentioned drawbacks.

The aim of the invention is to provide a safety system aimed at preventing the closure of the container as long as the retaining operation has not been performed.

The invention aims to provide a simple and effective system for immobilizing the rolls.

The invention also makes it possible to lock the spools even when the door is not closed; this enables the container to be moved without risk of causing the rolls to fall.

These various aims are achieved by means of a safety system for a container for products in strip form wound on cores, which container comprises a substantially horizontal cantilevered spindle having a free end and designed to support the cores and a door which can be located on the spindle by a locating device, the system comprising, at the free end of the spindle, an element able to move between a first position of rest in which the element does not project beyond the volume delimited by the cylinder of revolution generated by the internal diameter of the cores and prevents the closure of the door, and a second position of rest in which the element projects beyond the volume delimited by the cylinder generated by the internal diameter of the cores in order to prevent the cores from leaving the spindle and releases the locating device so as to allow the closure of the door.

In a preferred embodiment the safety system comprises a) an elongate hollow recess situated at the free end of the spindle and opening out on at least part of the periphery of the spindle, b) an element, the overall shape of which is a rectangular parallelpiped, able to be contained at least partially in the volume delimited by the hollow recess and c) means for attaching the element to the spindle allowing a movement of the element in the longitudinal direction of the recess.

In a particularly advantageous embodiment, the element is attached to the spindle by means of a pin disposed transversely to the recess and entering an oblong opening in the element. The element is provided at one of its ends with a circular surface centred on the end of the oblong opening which is closest so as to allow the tilting of this element in a plane perpendicular to the pin.

In another embodiment, the element is a slide attached to the spindle by means of two pins fixed to the spindle and disposed in an oblong opening in the slide, the length of the opening being greater than the distance between the two pins. A holding system comprising a stud forced in a given direction immobilizes the spindle and slide in one or other of the resting positions and one with respect to the other.

BRIEF DESCRIPTION OF THE DRAWINGS

Other characteristics and advantages will emerge from a reading of the following description given with reference to the accompanying drawing in which.

As mentioned previously, the invention is particularly useful in the transportation of photosensitive material with which it is very important that no light reaches the photosensitive product during transportation. It is more and more usual to transport rolls of photosensitive products of great length. These rolls have a length which may be as great as 2000 m, each weigh around 50 kg. They are generally transported by means of containers such as the ones described for example in the patents FR-A-2 658 156, FR-A-2 663 007 and FR-A-2 731 527. When they are transported by lorry the rolls can be subjected to significant accelerations which, because of their inertia, can cause them to move along the spindle and, in the absence of any system for immobilizing the rolls, the forces exerted on the door can deform it and even open it, irremediably damaging the photosensitive product.

DETAILED DESCRIPTION OF THE INVENTION

Figure 1:
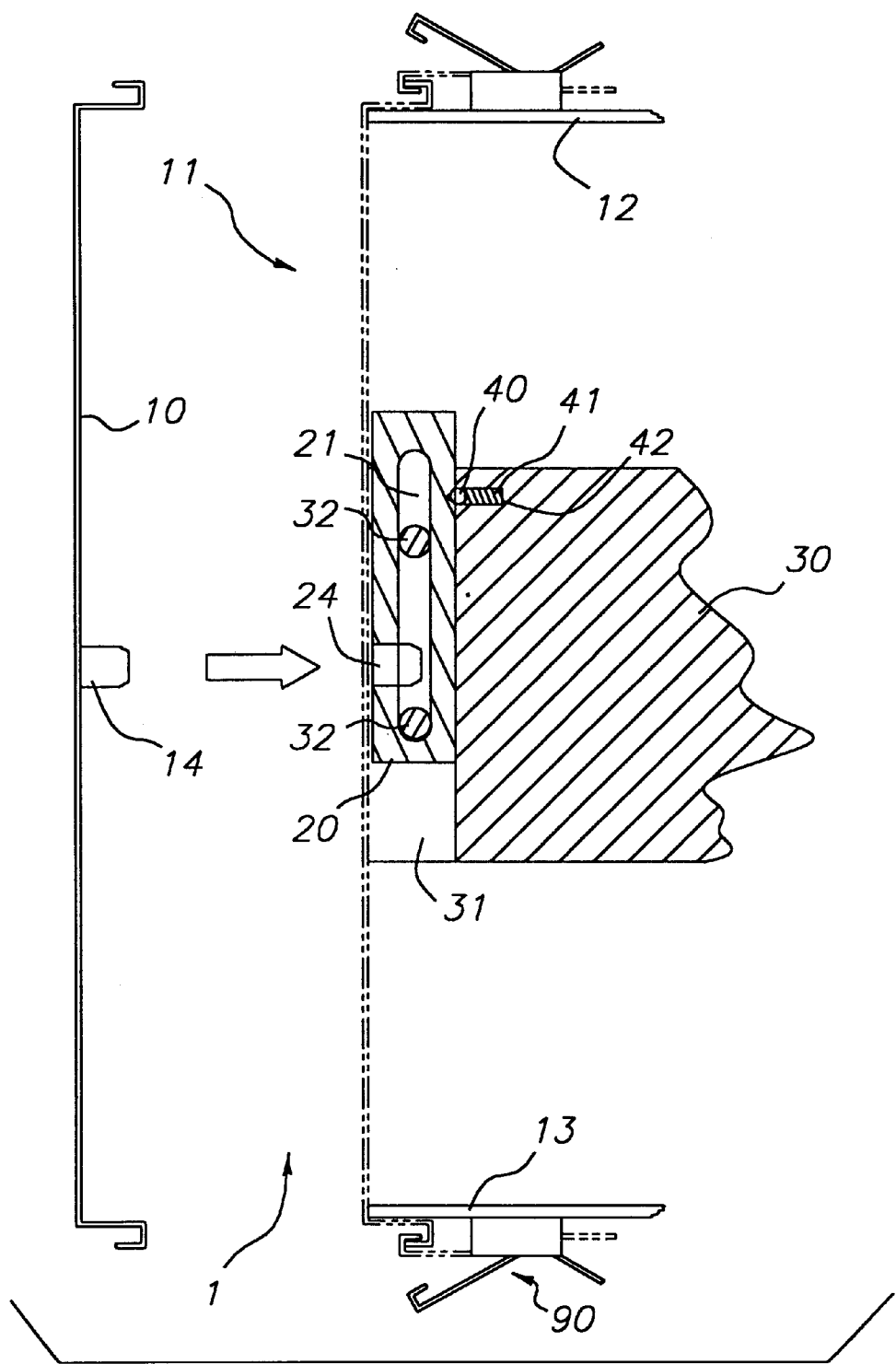
FIGS. 1 and 2 depict, schematically in cross section, a first embodiment of a device according to the invention in its two positions of rest.

FIG. 1 depicts highly diagrammatically the door 10 of a container 1 and one of the ends 11 of this container 1. For clarity of the drawing, the container has been depicted in this figure only by two of its lateral walls 12, 13 and by a spindle 30 which it contains. The spindle 30 disposed cantilevered inside the container is practically horizontal. This spindle receives rolls 5 of products in strip form (only one of which has been shown diagrammatically in FIG. 7). The container is provided with a system of locking the door 10, which, in the embodiment depicted in FIGS. 1 and 2, can adopt the form of a lever bolt 90 coming into engagement with a complementary part of the door.

Figure 2:
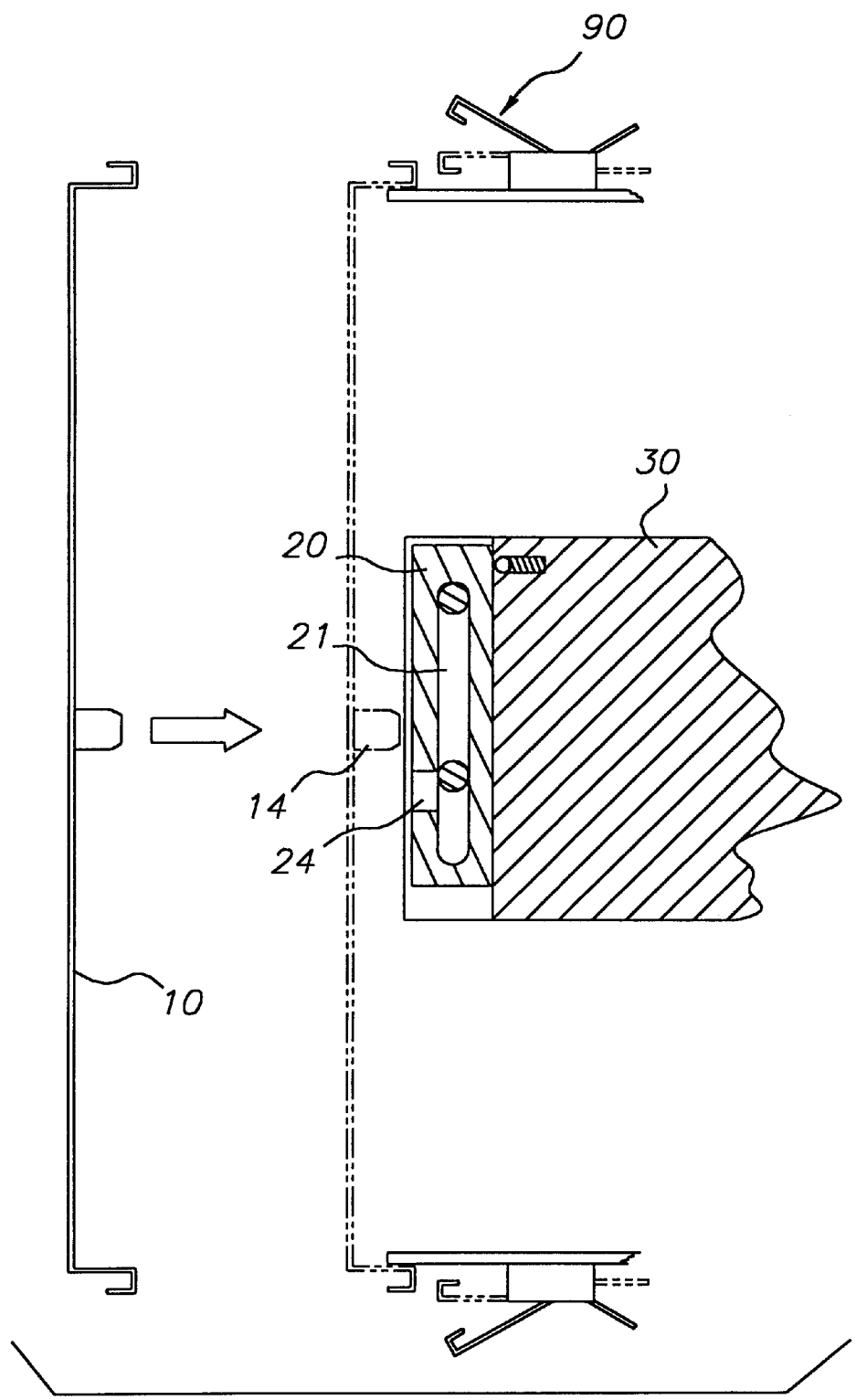
Figure 3:
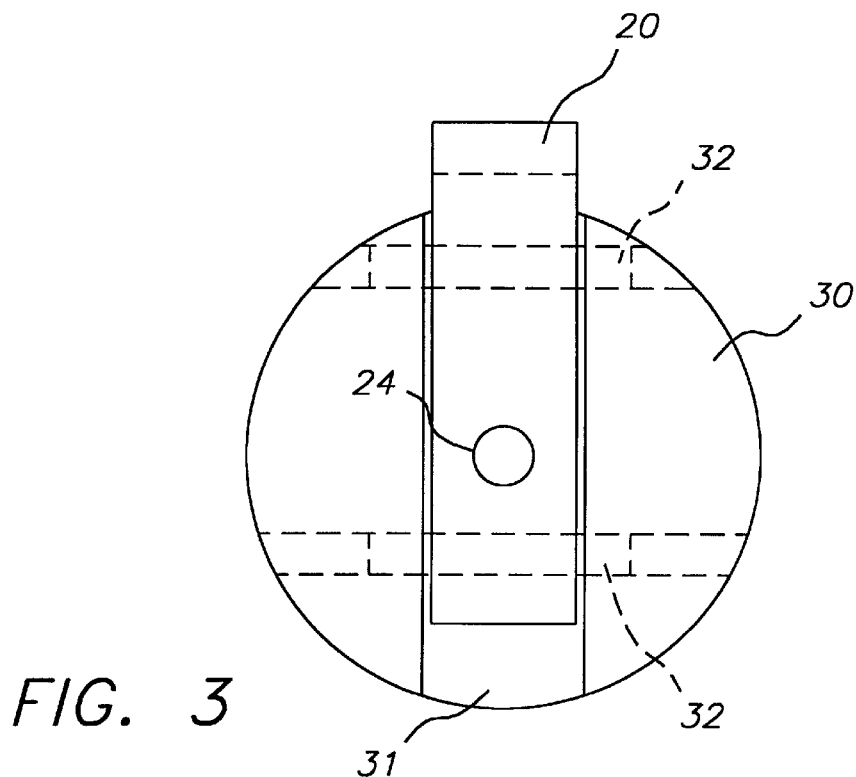
FIG. 3 depicts a front view of the spindle and slide forming an essential part of the safety system according to the invention.

In order to prevent the rolls from leaving the spindle during transportation, the end of the spindle is provided with an element or slide 20 attached to the spindle. As can be seen in FIG. 2 the slide is housed at least partially in a groove 31 or elongate hollow recess. Advantageously, the slide 20 is connected to the spindle 30 by means of two pins 32 disposed transversely to the groove 31 and passing through an oblong opening 21 made in the slide. The length of the oblong opening 21 is greater than the distance between the pins 32. In this way the slide is able to move in the groove parallel to the length of the hollow recess.

Figure 8:
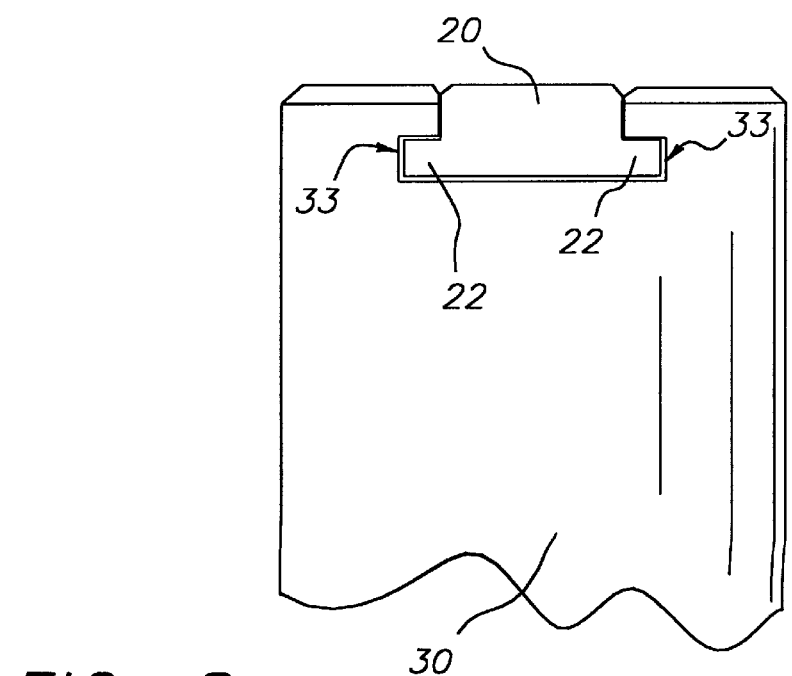
FIG. 8 depicts a partial cross section of another possible embodiment for a slide which can be used in the invention.

It is clear that the slide 20 can be connected to the spindle by any other suitable means. For example, as can be seen in FIG. 8, the slide can be provided with two lateral flanges 22 entering channels 33 in the spindle. In another embodiment the slide can have a trapezoidal cross section, the large base of which is in contact with the spindle; the groove 31 itself also having a complementary trapezoidal shape.

The slide 20 can be disposed in two different positions of rest depicted respectively in FIGS. 1 and 2. Advantageously, a holding means comprising a stud 40, forced in a given direction by a spring 41, enters a cavity, for example a V-shaped recess 23. In a particular embodiment, the spring is disposed in a niche 34 in the spindle so as to force the stud 40 towards the slide 20. Obviously the niche 34 could be formed in the slide 20. In this case, the stud 40 would be forced towards the spindle 30, the V-shaped recess being formed in the spindle.

In its first position of rest, depicted in FIG. 1, the slide 20 projects sufficiently beyond the volume delimited by the internal diameter of the cores on which the strips of photosensitive product are wound. In this way the rolls are not able to leave the spindle 30.

The slide 20 also comprises a cavity 24, the shape of which is complementary to a projecting part 14 carried by the door. As can be seen in broken lines in FIG. 1, when the slide 20 is in its first position of rest, the position of the cavity carried by the slide is such that the projecting part 14 of the door 10 enters the cavity 24 in order to be able to close the door. The cooperation between the cavity 24 and the projecting part 14 forms a locating device.

In its second position of rest, depicted in FIG. 2, the slide 20 has been moved so as not to project beyond the volume delimited by the internal diameter of the cores on which the strips of photosensitive product are wound. This second position of rest enables the rolls of photosensitive product to be loaded or unloaded. However, in this second position, the cavity 24 has been moved and, when it is desired to close the door 10 again, the projecting part 14 of this door is not able to enter the cavity and the operator is therefore not able to attach the door to the remainder of the container.

It is clear that each of the positions of rest can be defined by a V-shaped recess. However, in the embodiment depicted, the groove 31 has a practically vertical orientation and one of the positions of rest, the one in which the slide does not project beyond the volume delimited by the internal diameter of the cores, is defined by the lower position of the slide, that is to say the one in which the top part of the oblong opening comes into abutment on the top pin 32, which provides a stable position of rest. Under these conditions a single groove is necessary to provide stability for the other position of rest.

It is clear that it is also possible to define the first position of rest, the one in which the slide projects beyond the volume delimited by the internal diameter of the cores, by the cooperation of the top part of the oblong opening with the top pin. The V-shaped recess serving to define the position in which the slide does not project beyond the volume delimited by the internal diameter of the cores. This position makes it possible to lock the rolls on the spindle even in the event of breakage of the spring 42.

Figure 4:
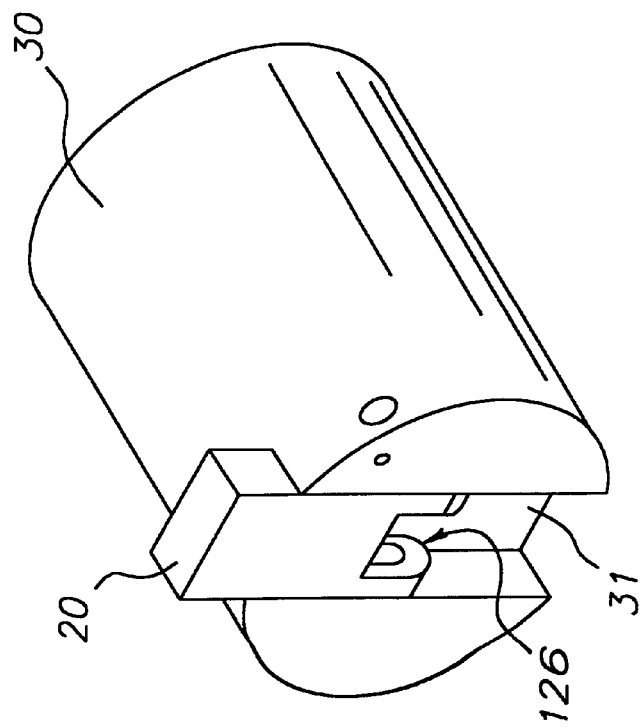
Figure 6:
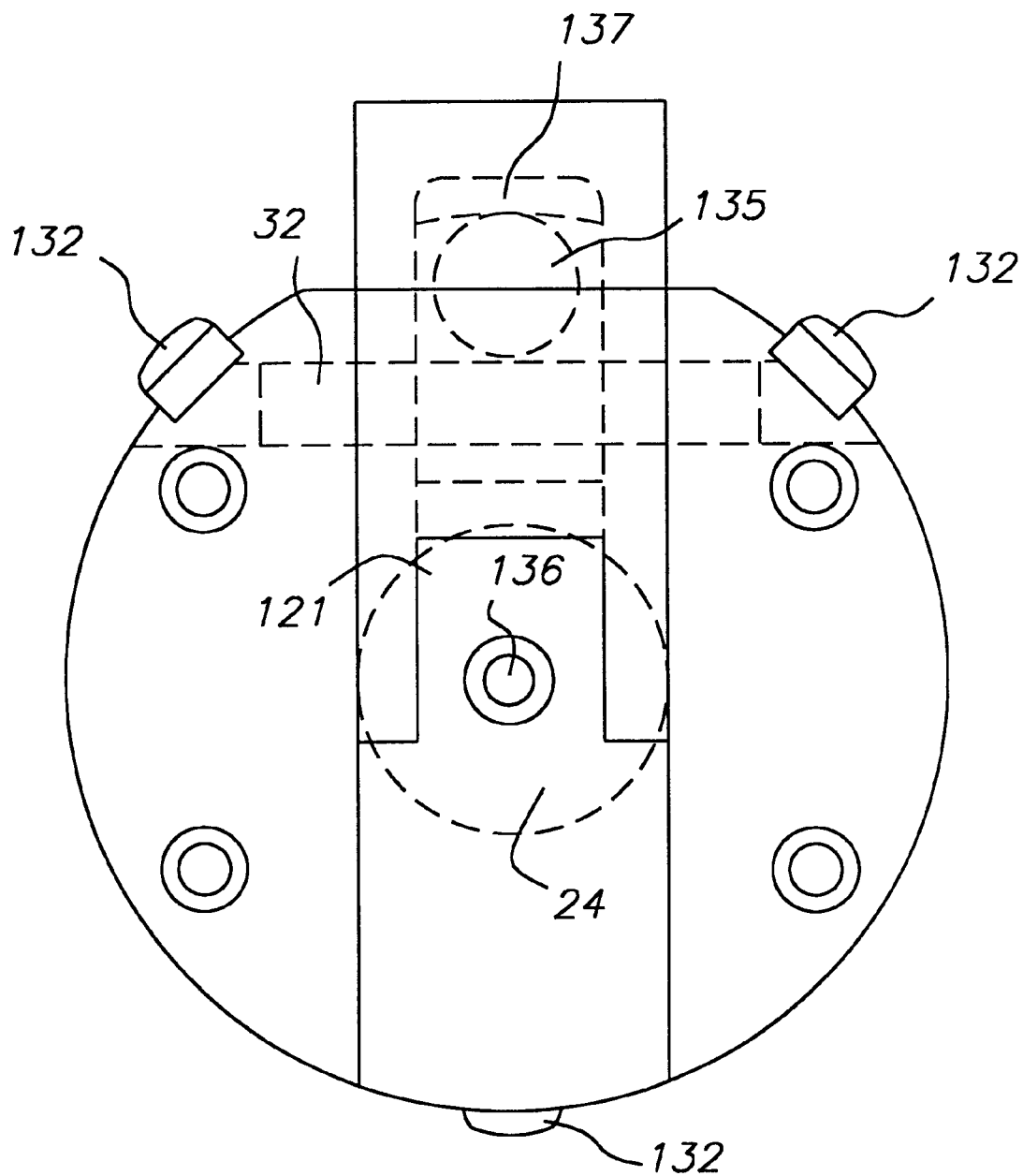
FIG. 6 depicts schematically a front view of the end of a spindle incorporating the system according to the invention.
Figure 7:
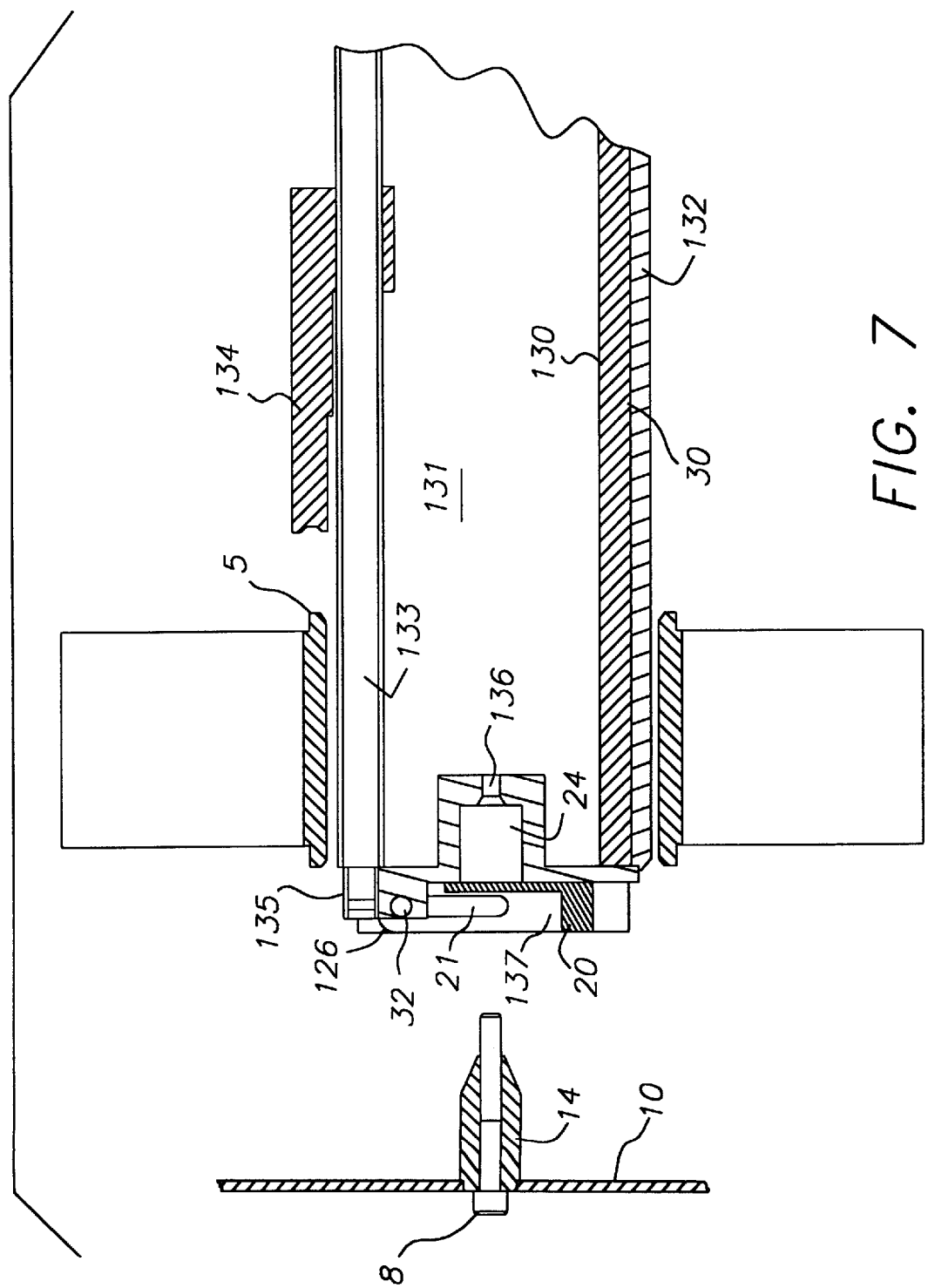
FIG. 7 depicts a view in section of a preferred embodiment of a spindle incorporating the system according to the invention.

FIGS. 4 and 7 depict another embodiment of the system according to the invention. In these figures the same numerical references have been used to represent elements having similar functions. In this embodiment, the spindle 30 is similar to the one used in the document FR-A-2 731 527. It is composed of a hollow tube 130 at the end of which a piece 131 has been screwed. The spindle is provided at its periphery with three sliding strips 132 made of suitable material. The strips 132 provide a flexible sliding support for the cores on which the photosensitive product is wound. Advantageously, and as indicated in the above-mentioned document, the container is provided with an extraction device 133 for causing the cores situated on the spindle to leave the container. This device comprises an endless screw 133 giving rise, through its rotation, to the movement of a pusher 134 along the spindle 30. One of the ends of the endless screw 133 enters a bearing 135 fixed to the piece 131. As indicated previously, in order to prevent the rolls from leaving the spindle during their transportation, the end of the spindle is provided with an element 20 attached to the spindle. As can be seen in FIG. 2, the element is housed at least partially in a groove 31 or elongate hollow recess. Advantageously, the element 20 is connected to the spindle 30 by means of a pin 32 disposed transversely to the groove 31 and passing through an oblong opening 21 formed in this element. In this way this element is able to move in the groove 31 parallel to the length of the hollow recess.

Figure 5:
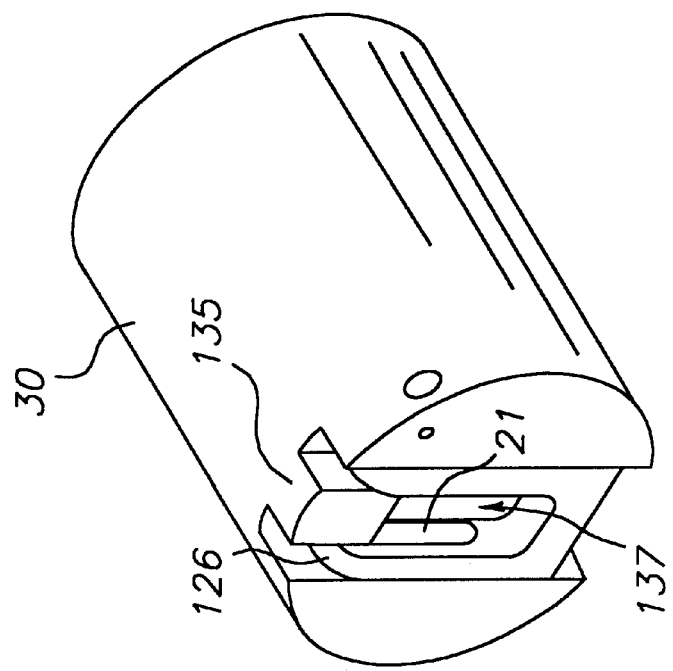
FIGS. 4 and 5 depict, schematically and in perspective, a second embodiment according to the invention.

The element 20 can be disposed in two different positions of rest depicted respectively in FIGS. 4 and 5. In this embodiment, the groove 31 is oriented in a substantially vertical direction so that the restoring force which has to be applied to the element 20 in order to maintain it in one or other of its positions of rest is produced by the force of gravity. The element 20 has at one of its ends a cylindrical surface 126 centred on the closer of the ends of the oblong opening 21 so as to be able to cause the element 20 to rotate in a plane perpendicular to the pin 32 which connects it to the piece 131.

In its first position of rest, depicted in FIG. 4, the pin 32 connecting the element to the spindle 30 is situated at the one of the ends of the oblong opening 21 which is not concentric with the circular surface 126. In this way, the element 20 forced downwards by its weight is not able to rotate about pin 32 since it is locked by the base of the groove 31 and is therefore immobilized. In this first position of rest, the element 20 projects sufficiently beyond the volume delimited by the internal diameter of the cores on which the strips of photosensitive product are wound, so that the rolls are not able to leave the spindle 30.

In order to move the element 20 from its first position of rest, depicted in FIG. 4, to its second position of rest, depicted in FIG. 5, the operator moves the element 20 upwards in order to bring the pin 32 to the end of the oblong opening 21 adjacent to the cylindrical surface 126 and then causes the element to pivot about pin 32. The element 20 then adopts the position depicted in FIG. 5 in which it does not project beyond the volume delimited by the internal diameter of the cores on which the strips of photosensitive product are wound. This second position of rest enables rolls of product in strip form to be introduced onto or removed from the spindle.

According to the invention the piece 131 is provided either with a cavity 24 or with a hole provided with a thread 136, or both. The door 20 either has a projecting part 14, similar to that depicted in FIG. 1, the shape of which is able to enter the cavity 24, or is locked by means of a screw 8 which is able to come into engagement with the thread 136 when the door is closed. However, according to the invention, the element 20 has a shape arranged so as to prevent the projecting part 14 of the door from cooperating with the cavity 24 of the piece 131 or the screw 8 from being introduced into the thread 136, when this element occupies its second position of rest depicted in FIG. 5. It is clear that the shape of the element must be adapted to the particular conditions of manufacture of the spindle or mounting thereof In the example depicted in the various FIGS. 4 to 7, the loading stresses due to the weight of the rolls and to the conditions of transportation of the containers give rise to stresses in the dimensions of the element 20. Because of this, it may be necessary to provide, on the element, a scalloping 121 or cutout whose shape allows cooperation between the projecting part and the cavity or between the screw and the threaded hole when the element is in its first position of rest and prevents such cooperation when the element is in its second position of rest.

In order to move the element 20 from its second position of rest, depicted in FIG. 5, to its first position of rest, depicted in FIG. 4, the operator first of all causes the element to tilt about the pin 32 in a plane perpendicular to the pin 32. This operation being possible because of the existence of a cylindrical surface centered on the end of the oblong opening which is closer to the circular surface. Once the operator has turned the element 20 through 180°, he allows the element, which is forced by its weight, to descend downwards. The pin 32 slides in the oblong opening 21 and comes to be housed in the end of the oblong opening which is further from the circular surface so that the element is immobilised with respect to rotation. Translation being possible only through the application of an external force since the weight of this element prevents it from moving up again on its own. In this first position of rest the scallop 121 comes opposite the cavity 24 or hole provided with the thread 136.

It is clear that, in the embodiment depicted in FIGS. 4 to 7, because of the existence of the bearing 135 projecting in the groove 31, it is necessary to provide a clearance 137 on the element 20 so that this bearing 135 can be housed in the element 20. This arrangement is obviously not necessary in other embodiments.

Advantageously, when it is desired to transport the rolls 5 with a minimum of risk, the element 20 is disposed in its first position so as to prevent the rolls from leaving the spindle 30. Then the pusher 134 is moved towards the free end of the spindle. This causes the rolls 5 to be put in abutment with each other and to be clamped between the pusher 134 and element 20.

Although the safety system according to the invention has been described with various embodiments, it is obvious that other modifications may be envisaged and that only the claims limit the scope of the invention.

Parts list

1 Container
5 Core
8 Screw
10 Door
11 End of container
12 Lateral wall
13 Lateral wall
14 Projecting part
20 Element—Slide
21 Oblong opening
22 Lateral wings
23 V-shaped recess
24 Cavity
30 Spindle
31 Hollow recess—Groove
32 Pin
33 Channels
34 Niche
40 Stud
41 Spring
90 Locking device
121 Scalloping
126 Cylindrical surface of revolution
131 Piece
132 Strip
133 Endless screw
134 Pusher
135 Bearing
136 Thread
137 Clearance

What is claimed is:

1. Safety system for a container for products in strip form wound on cores, which container comprises a substantially horizontal cantilevered spindle having a free end and designed to Support the cores and a door which can be located on the spindle by a locating device, the system comprising, at the free end of the spindle, an element able to move between a first position of rest in which the element does not project beyond the volume delimited by the cylinder of revolution generated by the internal diameter of the cores and prevents the closure of the door, and a second position of rest in which the element projects beyond the volume delimited by the cylinder generated by the internal diameter of the cores in order to prevent the cores from leaving the spindle and releases the locating device so as to allow the closure of the door.

2. Safety system according claim 1 further comprising:

at the free end of the spindle, an elongate hollow recess opening out on at least part of the periphery of the spindle;

an element, the overall shape of which is a rectangular parallelepiped, able to be contained at least partially in the volume delimited by the hollow recess;

means for attaching the element to the spindle allowing movement of the element in the longitudinal direction of the recess.

3. Safety system according to claim 2 wherein the attachment means is a pin fixed to the spindle and disposed transversely to the recess and entering an oblong opening formed in the element so as to allow the movement thereof.

4. Safety system according to claim 3 wherein the pin is perpendicular to the direction of movement of the element and one of the ends of the element is provided with a circular surface centered on the closer of the ends of the oblong opening so as to allow the tilting of this element in a plane perpendicular to the pin.

5. Safety system according to claim 4 wherein the length of the recess is disposed in a substantially vertical orientation, the force of gravity holding the element in one or other of its positions of rest.

6. Safety system according to claim 2 wherein the element is a slide and the attachment means is composed of two pins fixed to the spindle, disposed transversely to the recess, and entering an oblong opening formed in the slide, the length of this opening being greater than the distance separating the pins so as to allow movement of the slide in a direction substantially perpendicular to the pins.

7. Safety system according to claim 6 also comprising holding means for immobilizing the spindle and element with respect to each other in one or other of their positions of rest, this holding means comprising a stud forced in a given direction so as to cooperate with a recess determining the position of rest.

8. Safety system according to claim 7 wherein the locating device comprises a projecting part on the door cooperating with a cavity arranged in the slide.

9. Safety system according to claim 8 wherein the locating device serves to lock the door.

10. Safety system according to claim 9 wherein the locking device comprises a screw passing through the door and entering a corresponding thread on the spindle, the slide in its first position of rest being disposed opposite at least part of the thread on the spindle.

11. Safety system according to claim 5 wherein the locating device comprises a projecting part on the door cooperating with a cavity arranged in the slide.

12. Safety system according to claim 11 wherein the locating device serves to lock the door.

13. Safety system according to claim 12 wherein the locking device comprises a screw passing through the door and entering a corresponding thread on the spindle, the slide in its first position of rest being disposed opposite at least part of the thread on the spindle.

* * * * *